March 24, 1942.  C. S. KIMBROUGH  2,277,329
EDUCATIONAL DEVICE
Filed Dec. 6, 1939  2 Sheets-Sheet 1

Inventor
C. S. Kimbrough
By Clarence A. O'Brien
and Hyman Berman
Attorneys

Inventor
C. S. Kimbrough
By Clarence A. O'Brien
and Hyman Berman
Attorneys

Patented Mar. 24, 1942

2,277,329

UNITED STATES PATENT OFFICE 2,277,329

EDUCATIONAL DEVICE

Charley Samuel Kimbrough, Wiville, Ark.

Application December 6, 1939, Serial No. 307,814

1 Claim. (Cl. 35—37)

This invention relates to an educational device, the general object of the invention being to provide means for training certain parts of the body to write correctly in making figures, letters and the like by providing stencils having letters, figures and other characters or writing matter stencilled therein so that one moving a pencil through the characters will have his muscles, portions of the body and his eye trained to write, print and make characters correctly.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 3 is a view of a stencil plate having stencil characters therein for training parts of the body in moving a pencil in forming characters, letters and the like.

Figure 1:
Figure 1 is a view of a stencil plate having therein the letters of the alphabet all connected together.

In these views the numeral 1 represents a plate preferably of metal and having cut therein the stencil characters forming letters of the alphabet in different styles of type, figures and other characters so that these characters can be traced by a pencil following the walls of the openings, the plate 1 preferably being placed on a sheet 2 which, in turn, is placed on a base 3 which may be a glass plate so that the markings made by the pencil 4 following the walls of the openings in the stencil plate will be made on the sheet 2. These stencilled characters may be of any desired type such as the letters of the alphabet shown in Figure 1 and which are so connected together that the pencil can pass from one letter or character to the other to complete the entire alphabet.

Figure 2:
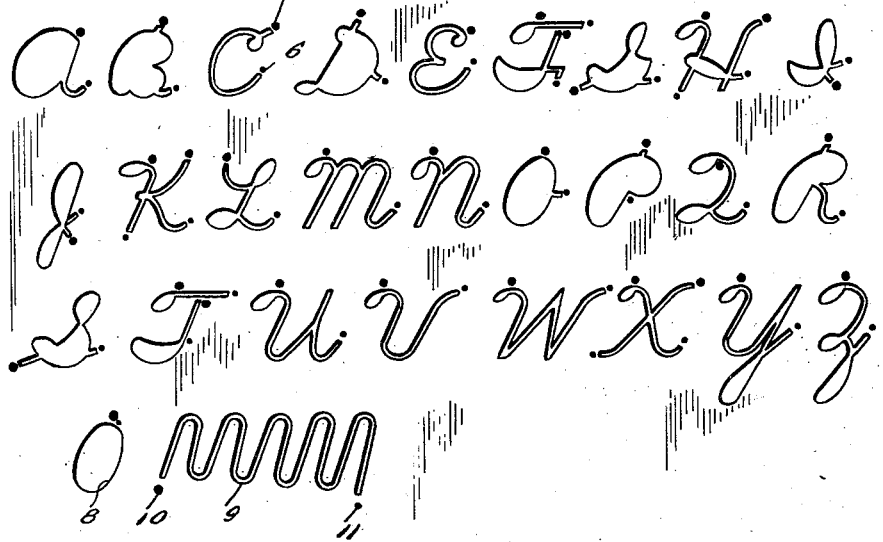
Figure 2 is a view of the stencil plate having other types of the alphabet thereon separated and with other stencil parts for training certain parts of the body in writing.
Figure 3:
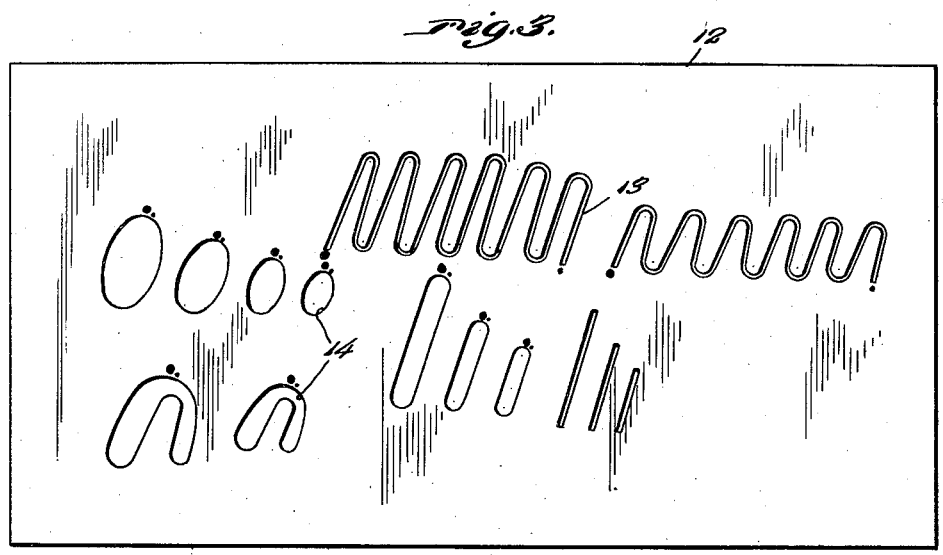
Figure 4:
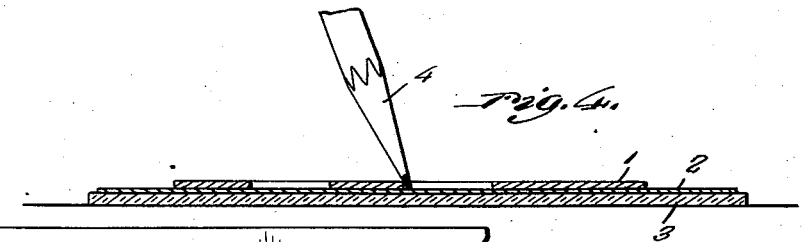
Figure 4 is a sectional view showing how the device is used.

Figure 2 shows the letters of the alphabet in capital letters separated and this figure also shows large dots 5 placed to indicate the beginning of the writing and a small dot to indicate the ending. These dots can be raised or variously colored. This plate shown at 7 in Figure 2 also is formed with an oblong opening 8 and a zig-zag slot 9 is formed with the starting dot 10 and the ending small dot 11. The stencil shown at 12 in Figure 3 is also provided with slots and various kinds of openings shown at 13 and 14 for training the parts of the body in moving a pencil or other pointed member to form lines similar to those formed in writing.

Figure 6:
Figure 6 is a fragmentary view of a stencil plate made in accordance with Figure 5.
Figures 5, 8:
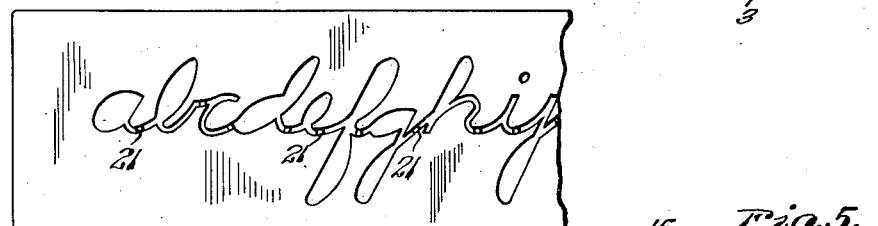
Figure 5 is a section through a stencil plate in which the walls of the characters have beveled walls.
Figure 8 is a detail view showing how a continuous slot, such as used in Figure 1 can be bridged wherever necessary and the bridge grooved.
Figure 7:
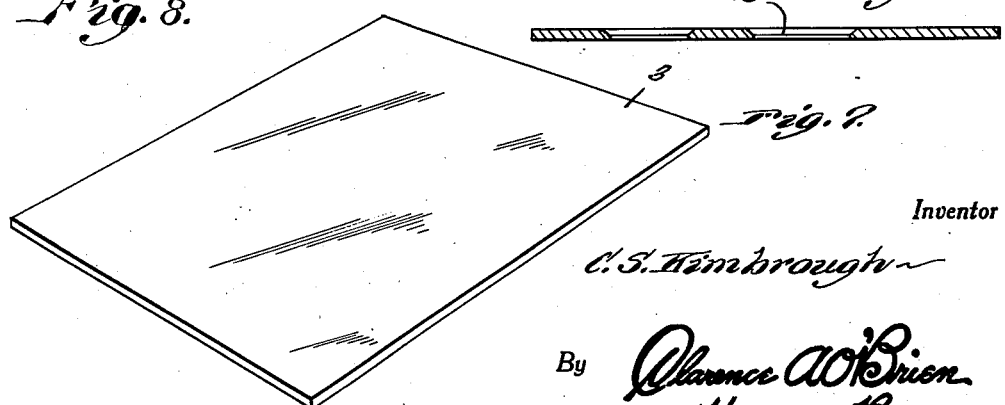
Figure 7 is a perspective view of a base member.

Figures 5 and 6 show the stencilled openings formed of beveled walls 15 so that the point of the pencil can by following these beveled walls cause the pencil to be held at an angle. As shown in Figure 5, the lower part of each slot has substantially straight walls with the beveled walls sloping upwardly and outwardly of these straight walls. The characters shown at 8 and 9 in Figure 2 and those shown in Figure 3 can be used by beginners to limber up the muscles and parts of the body used in writing after which the person can use the stencils having the letters of the alphabet or writing or figures thereon.

By following these letters or characters with a pencil or other pointed member one will be taught to write as the following of the stencilled characters will teach the person to properly use his muscles and properly position the parts of the body used in writing and it will also teach him the letters of the alphabet in different types, numerals and the like.

Where the slotted arrangement is a continuous one, as shown in Figure 1, in order to reinforce the plate, a bridge piece 21 may be left wherever necessary, this bridge piece passing over the slot and having a groove therein as shown in Figure 10 so that the pencil following the slot can pass over the bridge piece and enter the continuation of the slot. Also, arrows 22 can be formed on the plate to indicate the direction of movement of the pointed member following the outlines of the characters, these arrows being referred to as with a dot as shown.

It is thought from the foregoing description that the advantages and novel features of the invention will be readily apparent.

It is to be understood that changes may be made in the construction and in the combination and arrangement of the several papers provided that such changes fall within the scope of the appended claim.

Having described the invention, what is claimed as new is:

An educational appliance for teaching penmanship comprising a plate having characters cut therein to be followed by a pointed member, said cuts being in the form of slots extending entirely through the plate, said characters being connected together in a long row and grooved bridge pieces extending across certain parts of the cut characters for strengthening the plate, the grooves in the bridge pieces being formed in the upper faces of said bridge pieces and said grooves being wide enough to accommodate the pointed member, said grooves extending in the direction of the slot of which the grooves form a continuation.

CHARLEY SAMUEL KIMBROUGH.